United States Patent [19]

Yoshida et al.

[11] Patent Number: 5,051,465
[45] Date of Patent: Sep. 24, 1991

[54] SILICONE RUBBER COMPOSITION

[75] Inventors: Takeo Yoshida; Masaharu Takahashi, both of Annaka, Japan

[73] Assignee: Shin-Etsu Chemical Co., Ltd., Japan

[21] Appl. No.: 430,465

[22] Filed: Nov. 2, 1989

[30] Foreign Application Priority Data

Nov. 2, 1988 [JP] Japan .................. 63-278381

[51] Int. Cl.$^5$ ............................................. C08L 83/00
[52] U.S. Cl. ....................................... 524/588; 528/24; 524/860; 524/862
[58] Field of Search .................. 528/24; 524/588, 862, 524/860

[56] References Cited

U.S. PATENT DOCUMENTS

| 4,061,704 | 12/1977 | Barter | 264/83 |
| 4,771,099 | 9/1988 | Itoho et al. | 524/862 |

FOREIGN PATENT DOCUMENTS

| 59-18758 | 1/1984 | Japan . |
| 59-232145 | 12/1984 | Japan . |
| 60-16968 | 1/1985 | Japan . |
| 60-163860 | 8/1985 | Japan . |

Primary Examiner—Melvyn I. Marquis
Attorney, Agent, or Firm—Lowe, Price, Leblanc & Becker

[57] ABSTRACT

A silicone rubber composition which comprises an organopolysiloxane, a finely divided silica filler, and optionally an organosilicon compound having at least one ≡SiH bond in the molecule is described. When an organic peroxide of the following general formula

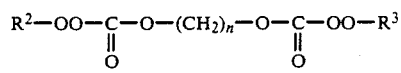

wherein n is an integer of from 2 to 8, and $R^2$ and $R^3$ are independently a monovalent hydrocarbon group having from 3 to 10 carbon atoms or a group of the formula, $Si(R^4)_3$, wherein $R^4$ represents a group selected from a methyl group, an ethyl group and a phenyl group, is added, surface tackiness and physical properties are remarkably improved.

13 Claims, No Drawings

SILICONE RUBBER COMPOSITION

BACKGROUND OF THE INVENTION

1. Field of the Invention

This invention relates to a silicone rubber composition and more particularly, to a silicone rubber composition of the hot air vulcanization type which, when vulcanized, gives no problems of void deficiency, surface tackiness and sanitation and is useful for wire coating as having good heat resistance and transparency.

2. Description of the Prior Art

Silicone rubbers have wide utility in various fields because of their good heat and cold resistances and good electric characteristics. A variety of techniques of processing such rubbers have been practised depending on the manner of application.

In particular, silicone rubbers have been vulcanized in different ways which depend on the type of rubber and the physical properties required for final cured product. Generally speaking, heat treatment in the presence of organic peroxides is the most popular for this purpose. A number of the organic peroxides may be mentioned including benzoyl peroxide, p-chlorobenzoyl peroxide, 2,4-chlorobenzoyl peroxide, dicumyl peroxide, di-t-butyl peroxide, 2,5-dimethyl-2,5-di(t-butyl peroxy)hexane, t-butyl perbenzoate, t-butylcumyl peroxide and the like. For obtaining moldings of good quality, such as tubings, electric wires, sheets and the like, by continuous hot air vulcanization by extrusion, 2,4-dichlorobenzoyl peroxide is only one vulcanizing agent which is now available for this purpose.

However, 2,4-dichlorobenzoyl peroxide has problems such as a corrosion problem on metal and a safety and hygienic problem of decomposed side products. Moreover, the cured products obtained from silicone rubbers using the peroxide are not necessarily satisfactory in heat resistance and compression set under sealed conditions. Organic peroxides for hot air vulcanization which are designed to solve the above problems have been proposed in U.S. Pat. No. 4,061,704 and include, for example, t-alkyl peroxyalkyl carbonates such as t-butyl peroxyoctadecyl carbonate, t-amyl peroxy-2,6,8-trimethyl-4-nonyl carbonate, t-amyl peroxyoctadecyl carbonate and the like. However, the use of the t-alkylperoxyalkyl carbonates alone does not provide cured product which can stand practical use. Additionally, such carbonates leave a kind of impurity having a large molecular weight in the product. The removal of the impurity is not easy. If it remains in the silicone rubber product, the heat resistance becomes poor.

On the other hand, it is known that for hot air vulcanization of silicone rubbers containing unsaturated groups, they are subjected to addition reaction in the presence of an organohydrogenpolysiloxane and a platinum catalyst. However, this silicone rubber composition is shorter in pot life than those compositions using organic peroxides, leading to a tendency toward scorching and limiting its application only to a certain field. Thus, such a composition will not be of the general-purpose type.

Aside from the organic peroxides indicated before, there are known other organic peroxides which are applicable for hot air vulcanization and can solve the problems on blooming and sanitation involved by the impurity or residue formed by decomposition. Examples of such organic peroxides include bis(ortho-methyl)benzoyl peroxide (Japanese Laid-open Patent Application No. 59-18758), bis(dimethyl-substituted benzoyl) peroxide (Japanese Laid-open Patent Application No. 60-16968), bis(trimethyl-substituted benzoyl) peroxide (Japanese Laid-open Patent Application No. 60-163860), bis(ortho-methoxybenzoyl)peroxide (Japanese Laid-open Patent Application No. 59-232145) and the like. However, cured products containing these peroxides undesirably exhibit surface tackiness which is greater than that produced by known the 2,4-dichlorobenzoyl peroxide. This surface tackiness is unfavorable as a value of final product. When these peroxides are used for medical service, it is necessary that in a UV absorption spectrum test, the absorbance at a wavelength of 220 mμ be not larger than 0.3. To attain this, postcuring should be inconveniently carried out to a satisfactory extent.

SUMMARY OF THE INVENTION

It is accordingly an object of the present invention to provide a silicone rubber composition which comprises an organic peroxide of a novel type whereby the composition is capable of hot air vulcanization and the resultant cured product is substantially free of any void deficiencies and surface tackiness.

It is another object of the invention to provide a silicone rubber composition of the hot air vulcanization type which, when vulcanized, is useful not only for wire coating or as a tube or sheet, but also for medical or food service.

The silicone rubber composition according to the invention comprises:

(a) 100 parts by weight of an organopolysiloxane of the following general average unit formula $$(R^1)_a SiO_{(4-a)/z}$$

wherein $R^1$'s independently represent an unsubstituted or substituted monovalent hydrocarbon group and a is a positive value of from 1.90 to 2.05;

(b) from 5 to 100 parts by weight of a finely divided silica filler;

(c) from 0 to 10 parts by weight of an organosilicon compound having at least one hydrogen atom directly bonded to a silicon atom ($\equiv$SiH bond) in the molecule; and (d) from 0.1 to 5 parts by weight of an organic peroxide of the following general formula (I)

$$R^2-OO-\underset{\underset{O}{\|}}{C}-O-(CH_2)_n-O-\underset{\underset{O}{\|}}{C}-OO-R^3 \qquad (I)$$

n is an integer of from 2 to 8, and $R^2$ and $R^3$ are independently a monovalent hydrocarbon group having from 3 to 10 carbon atoms or a group of the formula, $Si(R^4)_3$, wherein $R^4$ represents a group selected from the a methyl group, an ethyl group and a phenyl group.

As will be apparent from the above, when an organic peroxide of the above general formula (I) is added to a silicone rubber compound comprised of an organopolysiloxane and a finely divided silica filler with or without further addition of an organohydrogensiloxane having at least one $\equiv$SiH bond in the molecule, the resultant composition can continuously undergo hot air vulcanization. Such a composition produces little or no void or exhibits little surface tackiness when subjected to extrusion. Since the organic peroxide does not contain any halogen atom, little problem on safety and sanitation is presented. In addition, the organic peroxide is substantially free of any UV absorption. Thus, silicone products can be readily obtained by hot air vulcanization of the composition as having no corrosion problem on metals, a good heat resistance under sealed conditions and good compression set with good transparency. The vulcanized product is especially useful as tubes, coatings for wire and sheets.

DETAILED DESCRIPTION AND EMBODIMENTS OF THE INVENTION

The ingredient (a) used in the composition of the invention is an organopolysiloxane of the general average unit formula, $$(R^1)_a SiO_{(4-a)/2}$$

wherein $R^1$'s independently represent an unsubstituted or substituted monovalent hydrocarbon group and a is a positive value of from 1.90 to 2.05. Examples of the unsubstituted or substituted monohydrocarbon group include an alkyl group such as a methyl group, an ethyl group, a propyl group, a butyl group or the like, an alkenyl group such as a vinyl group, an allyl group, a butanyel group or the like, an aryl group such as a phenyl group, a tolyl group or the like, or the above-indicated alkyl, alkenyl or aryl group wherein part or all of the hydrogen atoms bonded to carbon atoms are substituted with a halogen atom, a cyano group or the like. Those substituted groups include a chloromethyl group, a chloropropyl group, a 3,3,3-trifluoropropyl group, a 2-cyanoethyl group and the like. $R^1$'s may be the same or different and are preferably a methyl group, a vinyl group or a phenyl group. The organopolysiloxane should preferably have a linear molecular structure but may contain an organopolysiloxane which has partially branched moieties in the molecule. Moreover, the organopolysiloxane should favorably be blocked with a triorganosilyl group or hydroxyl group at ends of the molecular chain. Examples of the triorganosilyl group include a trimethylsilyl group, a dimethylvinylsilyl group, a methylphenylvinylsilyl group, a methyldiphenylenesilyl group, a methylvinylsilyl group, a trivinylsilyl group and the like. The organopolysiloxane is not critical with respect to the degree of polymerization and should preferably have a viscosity of 300 centistokes or over at 25° C. In order to further reduce the surface tackiness, the terminal group at both ends of the molecular chain should preferably be a polyfunctional group such as, for example, of the following formula,

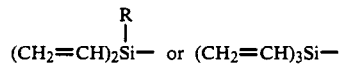

wherein R has the same meaning as $R^1$ defined before.

The ingredient (b) of the composition according to the invention is a finely divided silica filler which is used for the purpose of reinforcing the silicone rubber, increasing the viscosity of the composition and improving the workability and also for extension. Examples of such filler include fumed silica, silica obtained by a wet process or precipitated silica, fumed or precipitated silica whose surface has been subjected to hydrophobic treatment, finely divided quartz silica, diatomaceous earth and the like. The filler should preferably have a particle size of from 5 m$\mu$ to 10$\mu$. The filler is formulated in the composition in an amount of from 5 to 100 parts by weight, preferably from 20 to 80 parts by weight, per 100 parts by weight of the organopolysiloxane. If the amount is less than 5 parts by weight, an intended reinforcing effect cannot be expected with the workability becoming unsatisfactory. Over 100 parts by weight, the workability such as extrudability becomes extremely poor. Moreover, when such a composition is applied as a covering material for electric wire, a disadvantage is involved in that the properties such as heat resistance will not become high.

The ingredient (c) used in the composition is not an essential ingredient but is a preferred one. The organosilicon compound used as the ingredient (c) should have at least one ≡SiH bond. This organosilicon compound is effective in improving the surface tackiness after the vulcanization of the composition of the invention. This compound is usually linear or cyclic in structure but may comprise a small amount of an organosilicon compound with a branched chain structure or a three-dimensional structure. Examples of the organosilicon compound used as the ingredient (c) include methylhydrogenpolysiloxanes blocked with a trialkylsilyl group at ends of the molecular chain and having different degrees of polymerization, organopentasiloxane of the formula, $Si[OSi(CH_3)_2H]_4$, siloxane copolymers comprised of $SiO_2$ units and $(CH_3)_2HSiO_{0.5}$ units, copolymers of methylhydrogenpolysiloxanes and dialkylsiloxanes, polysilalkylenesiloxanes containing SiH bond or bonds, polysilanes, polycarbonsilanes, and the like.

As stated before, this ingredient is not an essential one but when it is added in an amount of larger than 10 parts by weight per 100 parts by weight of the ingredient (a), the physical properties, such as electric characteristics, a heat resistance and the like of final cured product, will lower. Accordingly, the amount is not larger than 10 parts by weight per 100 parts by weight of the ingredient (a).

Even if this ingredient is not added, the resultant cured product is improved in the surface tackiness to an extent. For obtaining a cured product which has a more improvement or is substantially free of any surface tackiness, it is preferred to add the organosilicon compound in an amount of not less than 0.05 parts by weight per 100 parts by weight of the organopolysiloxane.

The organic peroxide which is the ingredient (d) used in the composition of the invention should be free of any halogen atom and is of the following general formula $$R^2-OO-\underset{O}{\underset{\|}{C}}-O-(CH_2)_n-O-\underset{O}{\underset{\|}{C}}-OO-R^3$$

wherein n is an integer of from 2 to 8, and $R^2$ and $R^3$ independently represent a monovalent hydrocarbon group having from 3 to 10 carbon atoms or a group of the formula, $Si(R^4)_3$, in which each $R^4$ independently represents a methyl group, an ethyl group or a phenyl group. Examples of the monovalent hydrocarbon group independently represented by $R^2$ and $R^3$ include an n-propyl group, an iso-propyl group, a t-butyl group, an n-butyl group, an n-amyl group, a t-amyl group, a hexyl group, a heptyl group, an octyl group, a 2-ethylpropyl group, a 2-ethylbutyl group, a 2-ethylhexyl group, a cumyl group and the like. Examples of the Si-containing group include a trimethylsilyl group, a triethylsilyl group and a triphenylsilyl group. Preferably, $R^2$ and $R^3$ are independently an alkyl group having from 3 to 10 carbon atoms. More preferably, $R^2$ and $R^3$ are independently an n-propyl group, an iso-propyl group, an n-butyl group or a tert-butyl group. Specific examples of the peroxide include bis(t-butylperoxycarboxy)ethane, 1,3-bis(t-hexylperoxycarboxy)propane, 1,4-bis(1,1,3,3-tetramethylbutylperoxycarboxy)butane, 1,5-bis(cumylperoxycarboxy)pentane, 1,6-bis(p-isopropylcumylperoxycarboxy)hexane, 1,7-bis(m-isopropoylcumylperoxycaboxy)-heptane, 1,8-bis[2(4-methylcyclohexyl)isopropylperoxycarboxy]octane and the like. Of these, those indicated in examples which appears hereinafter are preferred.

These peroxides are novel compounds and can be prepared under conditions similar to those used for the preparation of known peroxide monocarbonates.

For instance, potassium salts of hydroxyperoxides and α,ω-dichloroformate of an n-alkane having from 2 to 8 carbon atoms are reacted to obtain the peroxide of the invention. The hydroxyperoxides used in the above reaction may be propylhydroperoxide, butylhydroperoxide, hexylhydroperoxide, 1,1,3,3-tetramethylbutylhydroperoxide, cumylhydroperoxide, p-menthanehydroperoxide, p-isopropylcumylhydroperoxide, m-isopropylcumylhydroperoxide and the like. The reaction proceeds at a temperature of from $-5°$ C. to $35°$ C., preferably from $10°$ to $20°$ for a time of from 0.5 to 3 hours, preferably from 1 to 2 hours. The molar ratio of the dichloroformate and the hydroperoxide is in the range of 1:2 to 4, preferably 1:2.2 to 2.8.

As will be seen from the above, the organic peroxides are free of any halogen atom such as a chlorine atom. The peroxides act as a vulcanizer for the organopolysiloxane used as the ingredient (a).

There is no fear that safety and sanitation problems are involved by decomposition of the peroxide, unlike halogen-containing peroxides. If the amount of the peroxide is less than 0.1 part by weight per 100 parts by weight of the organopolysiloxane ingredient (a), vulcanization may not proceed to a satisfactory extent with the possibility that the resultant cured product does not stand practical use. Over 5 parts by weight, an adverse influence on cured product will be produced by the excess peroxide which leaves a residue formed by decomposition thereof, coupled with an additional cost rise. Accordingly, the amount of the peroxide is in the range of from 0.1 to 5 parts by weight per 100 parts by weight of the ingredient (a).

The composition of the invention is obtained by uniformly mixing predetermined amounts of the respective ingredients (a), (b) and (d) with or without addition of the ingredient (c). The order of the addition of these ingredients is not critical. Usually, the silica filler (b) is added to the organopolysiloxane (a) to obtain a silicone rubber compound. Subsequently, the organic peroxide (d) and, optionally, the organosilicon compound (c) are added to the silicone rubber compound, followed by kneading such as with rolls.

The composition of the invention may further comprise dispersants such as low molecular weight siloxane, silanol group-containing silane and alkoxy group-containing silane having a degree of polymerization of not larger than 100, heat-resistant improvers such as iron oxide, cerium oxide, iron octanoate and the like, pigments, and other additives used for ordinary silicone rubber compositions.

The composition of the invention is converted into an elastomer by heating for vulcanization. For example, the heating is effected under conditions of a temperature of from $200°$ to $500°$ C. and a time of from five seconds to 10 minutes. As a matter of course, a so-called hot air vulcanization (HAV) process wherein heating by an infrared heater is combined with the above-mentioned heating conditions can be suitably used. The resultant elastomer is substantially free of voids and surface tackiness. Accordingly, the composition of the invention is useful for wire coating or as tubes or sheets and is also usable for the medical and food services.

The present invention is more particularly described by way of examples wherein parts are by weight and the viscosity is a measurement at $25°$ C. Comparative Examples are also described.

EXAMPLES 1,2 AND COMPARATIVE EXAMPLES 1 TO 3

100 parts of an organopolysiloxane which was blocked with a dimethylvinylsilyl group at both ends of the molecular chain and had 99.75 mole % of $(CH_3)_2SiO$ units and 0.25 mole % of $(CH_2=CH)(CH_3)Si$ units and whose viscosity was 10,000,000 centistokes was uniformly kneaded with 40 parts of fumed silica (Aerosil 200, available of Nippon Aerosil Co., Ltd.) and 4 parts of diphenylsilanediol as a dispersant. After heat treatment at $150°$ C. for 4 hours, the mixture was peptized for plasticization by means of two rolls to obtain a base compound.

After addition, to the base compound, of a methylhydrogenpolysiloxane which was blocked with a trimethylsilyl group at both ends of the molecular chain and which had 1.6 moles/100 g of $\equiv SiH$ bond in amounts indicated in Table 1, 1.0 part of organic peroxide liquid A of the following formula

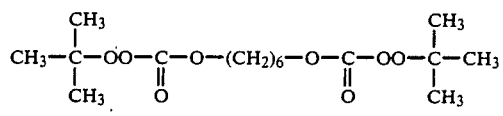

was added and kneaded by two rolls, followed by extrusion of the mixture on a tin-plated soft copper wire to form a 1 mm thick coating on the wire. This coated wire was subjected to hot air vulcanization in a hot air furnace kept at $400°$ C. for a residence time of 15 seconds, thereby obtaining a silicone rubber-coated wire having properties indicated in Table 1 without after-vulcanization.

For comparison, the above procedure of the Examples was repeated except that 1.5 parts of a 50% solution of 2,4-dichlorobenzoyl peroxide and 2 parts of a 50% solution of t-butyl peroxyoctadecyl carbonate were, respectively, used instead of the peroxide used in the examples. The results are also shown in Table 1.

TABLE 1

|  | Example | | Comparative Example | | |
|---|---|---|---|---|---|
|  | 1 | 2 | 1 | 2 | 3 |
| Composition (parts): | | | | | |
| organopolysiloxane | 100 | 100 | 100 | 100 | 100 |
| Aerosil 200 | 40 | 40 | 40 | 40 | 40 |
| dipheylsilanediol | 4 | 4 | 4 | 4 | 4 |
| methylhydrogenpolysiloxane | — | 0.5 | — | — | 0.5 |
| organic peroxide A liquid | 1.0 | 1.0 | — | — | — |
| 2,4-dichlorobenzoyl peroxide | — | — | 1.5 | — | — |
| t-butyl peroxyoctadecyl carbonate | — | — | — | 2 | 2 |
| Physical Properties: | | | | | |

TABLE 1-continued

| | Example | | Comparative Example | | |
|---|---|---|---|---|---|
| | 1 | 2 | 1 | 2 | 3 |
| surface tackiness* | ○ | ⊙ | ○ | X | △ |
| hardness | | | | | |
| initial | 61 | 60 | 60 | 48 | 50 |
| sealed | 56 | 57 | 43 | 38 | 41 |
| after heating** | (−5) | (−3) | (−17) | (−10) | (−9) |

Note:
*Surface tackiness
⊙ no tackiness to the touch
○ Little tackiness
△ slight degree of tackiness
X considerable degree of tackiness
**Heating in sealed condition ... a sample was placed in a sealed glass tube and heated at 200° C. for 3 days.

EXAMPLES 3,4 AND COMPARATIVE EXAMPLE 4

The general procedure of Examples 1 and 2 was repeated except that the methylhydrogenpolysiloxane used in Example 2 was replaced by another methylhydrogenpolysiloxane having an average composition of 50 mole % of $(CH_3)HSiO$ units, 45 mole % of $(CH_3)_2SiO$ units and 5 mole % of $(CH_3)_3SiO_{0.5}$ units and a viscosity of 18 centistokes, which was used in amounts indicated in Table 2, followed by treating and curing the resultant compositions as in Example 1. The physical properties of the cured products are shown in Table 2. From the table, it will be seen that when the methylhydrogenpolysiloxane is used in excess, the insulation resistance is lowered.

TABLE 2

| | Example | | Comparative Example |
|---|---|---|---|
| | 3 | 4 | 4 |
| Composition (parts): | | | |
| organopolysiloxane | 100 | 100 | 100 |
| Aerosil 200 | 40 | 40 | 40 |
| dipheylsilanediol | 4 | 4 | 4 |
| methylhydrogenpoly-siloxane | 0 | 1 | 15 |
| organic peroxide A liquid | 1.5 | 1.5 | 1.5 |
| Physical Properties: | | | |
| surface tackiness* | ○ | ⊙ | ⊙ |
| insulation resistance (MΩ)*** | 3,500 | 3,460 | 1,250 |

Note:
***Insulation resistance determined according to the method of JIS C-3004/1975.

EXAMPLE 5 AND COMPARATIVE EXAMPLE 5

40 parts by weight of fumed silica (Aerosil 200), 10 parts of dimethylpolysiloxane oil blocked with a silanol group at both ends of the molecular chain and having an average degree of polymerization of 8 and 0.3 parts of vinyltrimethoxysilane were added to and kneaded with 100 parts of an organopolysiloxane raw rubber which was blocked with a methyldivinylsilyl group at both ends of the molecular chain and which was composed of 99.8 mole % of $(CH_3)_2SiO$ units and 0.2 mole % of $(CH_3=CH)CH_3SiO$ units and had a degree of polymerization of 6,000, followed by heating at 150° C. for 4 hours, thereby obtaining a base compound.

To the base compound were added a methylhydrogensiloxane of the following formula in amounts indicated in Table 3

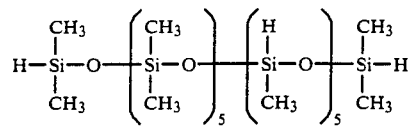

1.3 parts of an organic peroxide of the following formula

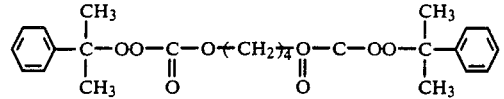

and a 50% paste of $Ca(OH)_2$ in amounts indicated in Table 3, followed by kneading to obtain two compositions. These compositions were each molded into a tube having an inner diameter of 5 mm and an outer diameter of 9 mm by the use of an extruder and subjected to hot air vulcanization under conditions of 300° C. and 60 seconds. The physical properties of the respective tubes were determined with the results shown in Table 3.

| | Example 5 | Comp. Ex. 5 |
|---|---|---|
| Composition (parts): | | |
| base compound | 150.3 | 150.3 |
| methylhydrogenpolysiloxane | 2.0 | — |
| organic peroxide | 1.3 | 1.3 |
| $Ca(OH)_2$ paste | — | 1.0 |
| Physical Properties: | | |
| surface tackiness | ○ | ○ |
| transparency | good | poor |
| tensile strength (kg/cm²) | 93 | 89 |

EXAMPLE 6

40 parts of fumed silica (Aerosil 200) and 4 parts of diphenylsilanediol as a dispersant were added to and uniformly kneaded with 100 parts of an organopolysiloxane which was blocked with a trivinylsilyl group at both ends of the molecular chain and which was composed of 99.75 mole % of $(CH_3)_2SiO$ units and 0.25 mole % of $(CH_2)_3SiO_{0.5}$ units and had a viscosity of 10,000,000 centistokes, followed by thermal treatment at 150° C. for 4 hours and peptization for plasticization with two rolls to obtain a base compound.

To the base compound were added 0.5 parts of methylhydrogenpolysiloxane blocked with a trimethylsilyl group at both ends of the molecular chain and containing 1.6 moles/100 g of ≡SiH bond and 2 parts of a C solution of an organic peroxide of the following formula diluted with a silicone oil having a viscosity of 10,000 centistokes to a concentration of 50 wt %. The mixture was kneaded with two rolls and was extruded on a tin-plated soft copper wire with an outer diameter of 3 mmφ to form a 1 mm thick coating on the wire. The coated wire was subjected to atmospheric hot air vulcanization in a hot air furnace kept at 400° C. for a residence time of 15 seconds. As a result, there was obtained the silicone rubber-coated wire having the physical properties indicated in Table 4 without after-vulcanization.

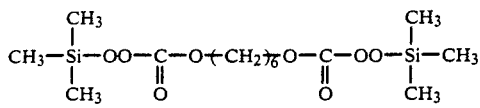

TABLE 4

|  | Example 6 |
| --- | --- |
| Composition (parts): |  |
| polyorganosiloxane | 150.3 |
| Aerosil 200 | 40 |
| diphenylsilanediol | 4 |
| methylhydrogenpolysiloxane | 0.5 |
| organic peroxide (C solution) | 2.0 |
| Physical Properties: |  |
| surface tackiness | ⊚ |
| hardness |  |
| initial | 65 |
| after heating in sealed | 59 |
| condition**** | (−6) |

Note:
****the sample was placed in a sealed glass tube and heated at 200° C. for 3 days.

What is claimed is:

1. A silicone rubber composition which comprises:
100 parts by weight of an organopolysiloxane of the following general average unit formula $$(R^1)_a SiO_{(4-a)/2}$$

wherein $R^1$'s independently represent an unsubstituted or substituted monovalent hydrocarbon group and a is a positive value of from 1.90 to 2.05; from 5 to 100 parts by weight of a finely divided silica filler; and
from 0.1 to 5 parts by weight of an organic peroxide of the following general formula (I)

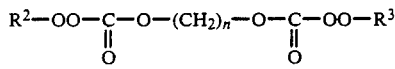

n is an integer of from 2 to 8, and $R^2$ and $R^3$ are independently a monovalent hydrocarbon group having from 3 to 10 carbon atoms or a group of the formula, $-Si(R^4)_3$, wherein $R^4$ represents a group selected from a methyl group, an ethyl group or a phenyl group.

2. The silicone rubber composition according to claim 1, wherein said organopolysiloxane is blocked with a triorganosilyl group or hydroxyl group at both ends of the molecular chain.

3. The silicone rubber composition according to claim 2, wherein said organopolysiloxane is blocked at both ends of the molecular chain with a group of the formula,

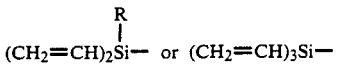

wherein R has the same meaning as $R^1$ defined before.

4. The silicone rubber composition according to claim 1, wherein the silica filler is present in an amount of from 20 to 80 parts per 100 parts by weight of the organopolysiloxane.

5. The silicone rubber composition according to claim 1, wherein $R^2$ and $R^3$ are independently an alkyl group having from 3 to 10 carbon atoms.

6. The silicone rubber composition according to claim 5, wherein $R^2$ and $R^3$ are independently an n-propyl group, an iso-propyl group, an n-butyl group or a tert-butyl group.

7. The silicone rubber composition according to claim 1, wherein the organic peroxide is of the following formula

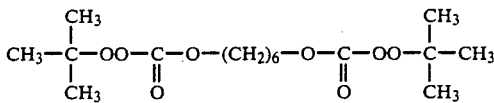

8. The silicone rubber composition according to claim 1, wherein the organic peroxide is of the following formula

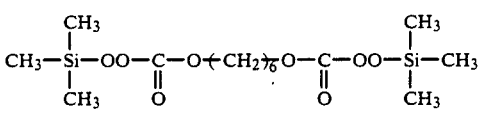

9. The silicone rubber composition according to claim 1, wherein the organic peroxide is of the following formula

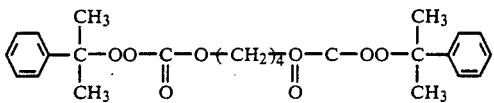

10. The silicone rubber composition according to claim 1, further comprising up to 10 parts by weight, per 100 parts by weight of the organopolysiloxane, of an organosilicon compound having at least one hydrogen atom directly bonded to a silicon atom.

11. The silicone rubber composition according to claim 10, wherein said organosilicon compound is used in an amount of from 0.5 to 10 parts by weight per 100 parts by weight of the organopolysiloxane.

12. The silicone rubber composition according to claim 10, wherein said organosilicon compound is linear or cyclic in structure.

13. The silicone rubber composition according to claim 10, wherein said organosilicon compound has a ≡SiH bond in the molecule.

* * * * *